(12) United States Patent
Rachmatullah et al.

(10) Patent No.: US 11,531,449 B2
(45) Date of Patent: Dec. 20, 2022

(54) INFORMATION PROCESSING DEVICE, INFORMATION PROCESSING METHOD, PROGRAM AND STORAGE MEDIUM FOR EFFICIENTLY MANAGING A BROWSING TIME OF A WINDOW ON A BROWSER BY ANOTHER WINDOW

(71) Applicant: Rakuten Group, Inc., Tokyo (JP)

(72) Inventors: Agro Rachmatullah, Tokyo (JP); Kazutoshi Kinoshita, Tokyo (JP); Eiji Fukuda, Tokyo (JP); Hirohisa Tanigawa, Tokyo (JP); David Castellanos, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 599 days.

(21) Appl. No.: 16/477,689

(22) PCT Filed: Mar. 16, 2018

(86) PCT No.: PCT/JP2018/010614
§ 371 (c)(1),
(2) Date: Jul. 12, 2019

(87) PCT Pub. No.: WO2019/176111
PCT Pub. Date: Sep. 19, 2019

(65) Prior Publication Data
US 2021/0349585 A1 Nov. 11, 2021

(51) Int. Cl.
*G06F 3/0483* (2013.01)
*G06Q 30/02* (2012.01)
(52) U.S. Cl.
CPC ....... *G06F 3/0483* (2013.01); *G06Q 30/0272* (2013.01)
(58) Field of Classification Search
CPC .............. G06F 3/0483; G06F 13/00; G06F 2203/04803; G06Q 30/0272
See application file for complete search history.

(56) References Cited

U.S. PATENT DOCUMENTS 7,660,737 B1* 2/2010 Lim ................... G06Q 30/0269
705/14.49
10,356,486 B2* 7/2019 Kumar Bvn ....... H04N 21/2387
(Continued)

FOREIGN PATENT DOCUMENTS

JP  2007-328423 A  12/2007
JP  2010-026976 A  2/2010

OTHER PUBLICATIONS

"Advertisement Skip Button" https://blog.naver.com/rakbin/10169270655, May 29, 2013 (3 pages total).
(Continued)

*Primary Examiner* — Matthew Ell
*Assistant Examiner* — Kenny Nguyen
(74) *Attorney, Agent, or Firm* — Sughrue Mion, PLLC

(57) ABSTRACT

An information processing device generates web page data of a first window including a program causing a terminal device to execute an elapsed time determination process for obtaining first time information at a timing of a transition from the first window to a second window, obtaining second time information at a timing during which a process in the first window is executable in a state after the transition to the second window, calculating an elapsed time from a difference between the first time information and the second time information, and executing a predetermined process according to a comparison between the elapsed time and a threshold time. The information processing device executes a process for transmitting the web page data to the terminal device and causing the terminal device to present the web page data.

8 Claims, 11 Drawing Sheets

(56) References Cited

U.S. PATENT DOCUMENTS

| | | | |
|---|---|---|---|
| 2012/0185799 A1* | 7/2012 | Tsai | G06F 9/451 |
| | | | 715/804 |
| 2013/0166392 A1* | 6/2013 | Park | G06Q 30/02 |
| | | | 705/14.68 |
| 2014/0019589 A1* | 1/2014 | Ross | G06F 11/3476 |
| | | | 709/217 |
| 2014/0136313 A1* | 5/2014 | Shaw | G06Q 30/0242 |
| | | | 705/14.41 |
| 2014/0195356 A1* | 7/2014 | Kim | G06Q 30/0267 |
| | | | 705/14.64 |
| 2017/0195745 A1* | 7/2017 | Kumar Bvn | H04N 21/2387 |

OTHER PUBLICATIONS

Getdon, https://blog.naver.com/haunting12/30148262864, Oct. 1, 2012 (22 pages total).

International Search Report of PCT/JP2018/010614 dated May 22, 2018 [PCT/ISA210].

* cited by examiner

FIG. 3

USER DB 32

| USER ID | NAME | AGE | SEX | ADDRESS | E-MAIL ADDRESS | POINT INFORMATION | BROWSING TIME INFORMATION |
|---------|------|-----|-----|---------|----------------|-------------------|---------------------------|
| 0000001 | ○○×× | 32 | MALE | ○×△··· | ×××-○○○@,··· | 123pt | ··· |
| 0000002 | □□△△ | 50 | FEMALE | □×○··· | △△△-○○○@,··· | 2345pt | ··· |
| 0000003 | ××□□ | 18 | FEMALE | ○△×··· | ×○○-△△△@,··· | 210pt | ··· |
| ··· | ··· | ··· | ··· | ··· | ··· | ··· | ··· |

INFORMATION PROCESSING DEVICE, INFORMATION PROCESSING METHOD, PROGRAM AND STORAGE MEDIUM FOR EFFICIENTLY MANAGING A BROWSING TIME OF A WINDOW ON A BROWSER BY ANOTHER WINDOW

CROSS REFERENCE TO RELATED APPLICATIONS

This application is a National Stage of International Application No. PCT/JP2018/010614, filed Mar. 16, 2018.

TECHNICAL FIELD

The present invention relates to an information processing device, an information processing method, a program, and a storage medium and especially relates to a technical field of a window display on a browser.

BACKGROUND ART

There has been known a service for jumping to another web page by selection of a link provided in a web page. In this case, the other web page may be displayed in a window different from that of the currently displayed web page.

Patent Literature 1 describes the following content display method. When a link for screen transition is selected while content is displayed in a first window, the method generates a second window in a specific area in the identical content.

CITATION LIST

Patent Literatures

Patent Literature 1: JP 2010-26976 A

SUMMARY OF INVENTION

Technical Problem

Among such services, some services execute a process of a web page before jumping according to a browsing time of a window of another web page. For example, there is a service that, after jumping of a main page to an advertisement page, a process on a main page side detects a browsing situation of this advertisement page.

While application software (hereinafter also referred to as application) conventionally provides the service as described above, recently, there has been proposed a provision with a web page such that a user is not bothered by downloading.

However, in such service, a web page of a link destination is not always a web page provided by an agent of this service. Accordingly, in a state where another web page is focused, for a convenience of a process on a browser, determination whether another web page is browsed from the web page by the agent of this service was difficult.

Therefore, an object of the present invention is to efficiently manage a browsing time of another web page in a framework of a process allowed on a browser of a web page by an agent of this service.

Solution to Problem

An information processing device according to the present invention includes a page generating unit and a presentation control unit. The page generating unit generates web page data of a first window including a program causing a terminal device to execute an elapsed time determination process for: obtaining first time information at a timing of a transition from the first window to a second window; obtaining second time information at a timing during which a process in the first window is executable in a state after the transition to the second window; calculating an elapsed time from a difference between the first time information and the second time information; and executing a predetermined process according to a comparison between the elapsed time and a threshold time. The presentation control unit executes a process for transmitting the web page data of the first window to the terminal device and causing the terminal device to present the web page data.

The information processing device generates page data information with the plug-in program for executing the above-described processes and transmits the page data information to the terminal device. This allows measuring the presentation period of the second window by obtaining the time information at the timing during which the process is executable even when the processes on the first window side in the terminal device are restricted.

The following is possible in the above-described information processing device. The page generating unit generates the web page data of the first window including a program causing the terminal device to execute a process for determining whether the second window is focused, and when determining that the second window is unfocused, terminating the elapsed time determination process.

Accordingly, with the second window unfocused, the terminal device does not measure the presentation period of the second window.

The following is possible in the above-described information processing device. The elapsed time determination process includes a process for transmitting this elapse information to the information processing device when the elapsed time passes over the threshold time or more.

Obtaining the elapse information of the presentation period of the second window from the terminal device allows the information processing device to execute a process according to this elapse information.

The following is possible in the above-described information processing device. When the elapse information is received, user information is updated.

That is, according to the presentation of the content presented in the second window for a predetermined period, the information processing device can give a privilege to a user considered as browsing this content.

The following is possible in the above-described information processing device. When the elapsed time reaches the threshold time or more, the elapsed time determination process includes a process for transmitting information on content presented in the second window to the information processing device.

This allows the information processing device to obtain content information browsed for the period of the threshold or more.

The following is possible in the above-described information processing device. The page generating unit generates the web page data of the first window including a program causing the terminal device to execute a process for, when receiving operation information to transition from the first window to the second window, transmitting a request of web page data presented in the second window after obtaining the first time information.

This allows obtaining the first time information before the terminal device receives the web page data presented in the second window and presents this web page in the second window.

The following is possible in the above-described information processing device. The process of the page generating unit is executed on a browser in the terminal device.

The process by the program on the first window side is restricted while the second window is presented due to specifications of the browser.

An information processing method according to the present invention is an information processing method executed by an information processing device that includes: a page generating step of generating web page data of a first window including a program causing a terminal device to execute an elapsed time determination process for: obtaining first time information at a timing of a transition from the first window to a second window; obtaining second time information at a timing during which a process in the first window is executable in a state after the transition to the second window; calculating an elapsed time from a difference between the first time information and the second time information; and executing a predetermined process according to a comparison between the elapsed time and a threshold time; and a presentation control step of executing a process for transmitting the web page data of the first window to the terminal device and causing the terminal device to present the web page data.

A program according to the present invention is a program for causing an information processing device to execute the respective processes of the above-described information processing method. A storage medium according to the present invention is a storage medium storing the above-described program.

These program and storage medium achieve the above-described information processing device.

An information processing method according to the present invention is an information processing method executed by a terminal device includes: a first time information obtaining step of obtaining first time information at a timing of a transition from a first window to a second window; a second information obtaining step of obtaining second time information at a timing during which a process in the first window is executable in a state after the transition to the second window; an elapsed time calculation step of calculating an elapsed time from a difference between the first time information and the second time information; and an elapsed time determination step of executing a predetermined process according to a comparison between the elapsed time and a threshold time.

A program according to the present invention is a program for causing a terminal device to execute the respective processes of the above-described information processing method. A storage medium according to the present invention is a storage medium storing the above-described program.

These program and storage medium achieve the above-described terminal device.

Advantageous Effects of Invention

The present invention allows monitoring the presentation situation of the second window even under the situation where the process on the first window side is restricted.

BRIEF DESCRIPTION OF DRAWINGS

FIG. 3 is an explanatory view of a user database according to the embodiment;

DESCRIPTION OF EMBODIMENTS

The following describes embodiments in the order listed below.
<1. Overall Configuration>
<2. Functions of Server, User Terminal, Advertisement Server and DB>
<3. Outline of Presentation Screen in User Terminal>
<4. Outline of Process of Browsing State Storage System>
<5. Processes by Server and User Terminal>
<6. Summary and Modifications>
<7. Program and Storage Medium>

1. Overall Configuration

The following describes an overall configuration of a network system according to the embodiments.

Figure 1:
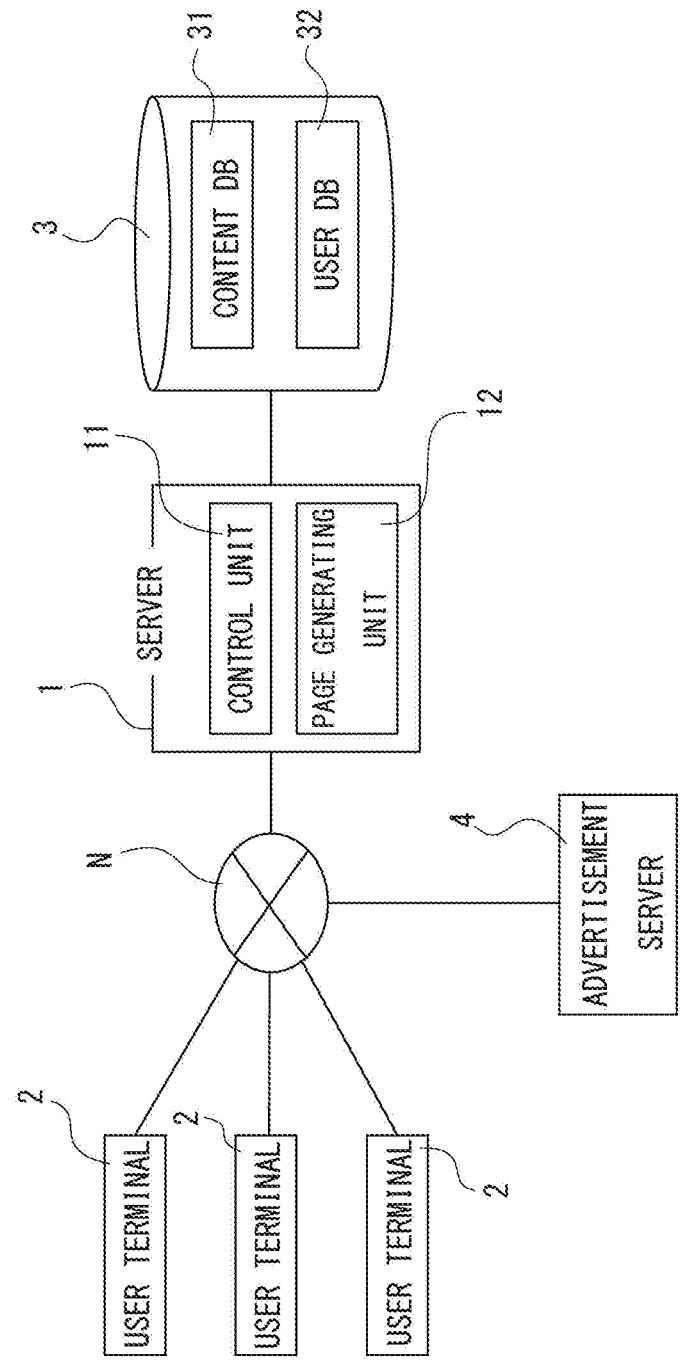
FIG. 1 is an explanatory view of an exemplary configuration of a network system according to an embodiment.

FIG. 1 illustrates an exemplary configuration of the network system according to the embodiment. In this example, this network system functions as the browsing state storage system that stores a period during which a user terminal presents content as user information in a database in a server.

The user terminal includes a web browser and executes various processes according to a browsing state of the content based on web page data received from the server.

The embodiment describes a service (hereinafter also referred to as this service) that gives a point to a user who has browsed an advertisement for a certain period of time or more as one example of the browsing state storage system.

A server 1 in FIG. 1 is equivalent to an information processing device of the claims of the present invention.

As illustrated in FIG. 1, in the network system according to the embodiment, the server 1, one or a plurality of user terminals 2, and one or a plurality of advertisement servers 4 are coupled over a network N in a mutually communicative state. The server 1 is accessible to a database 3.

Note that, hereinafter, the database is also referred to as a DB (Database).

Various examples are possible for a configuration of the network N. For example, the Internet, intranet, extranet, Local Area Network (LAN), Community Antenna TeleVision (CATV) communications network, Virtual Private Network (VPN), telephone network, mobile communications network, and satellite communications network are assumed.

Various examples are possible also for a transmission medium that constitutes all or a part of the network N. For example, it is usable either in wired with, for example, Institute of Electrical and Electronics Engineers (IEEE) 1394, Universal Serial Bus (USB), power-line carrier, and telephone line, or in wireless with, for example, infrared, such as Infrared Data Association (IrDA), BLUETOOTH™, 802.11 wireless, mobile phone network, satellite channel, and terrestrial digital network.

The server 1 is an information processing device for an operation side of this service. The server 1 is, for example, achieved by a computer device and the like including a communication function installed in a company of the operation side.

The user terminal 2 is an information processing device used by the user who uses this service, that is, browses the advertisement. For example, a feature phone and a PDA with the communication function, or a smart device, such as a smart phone and a tablet terminal are possible as the user terminal 2. Note that the user terminal 2 may be achieved by, for example, a Personal Computer (PC) with the communication function.

The advertisement server 4 is an information processing device for a side providing the advertisement presented in this service. The advertisement server 4 is, for example, achieved by a computer device and the like including a communication function.

A DB 3 means comprehensive DB storing information necessary for the server 1 to execute processes. Details of the DB 3 will be described later.

Figure 2:
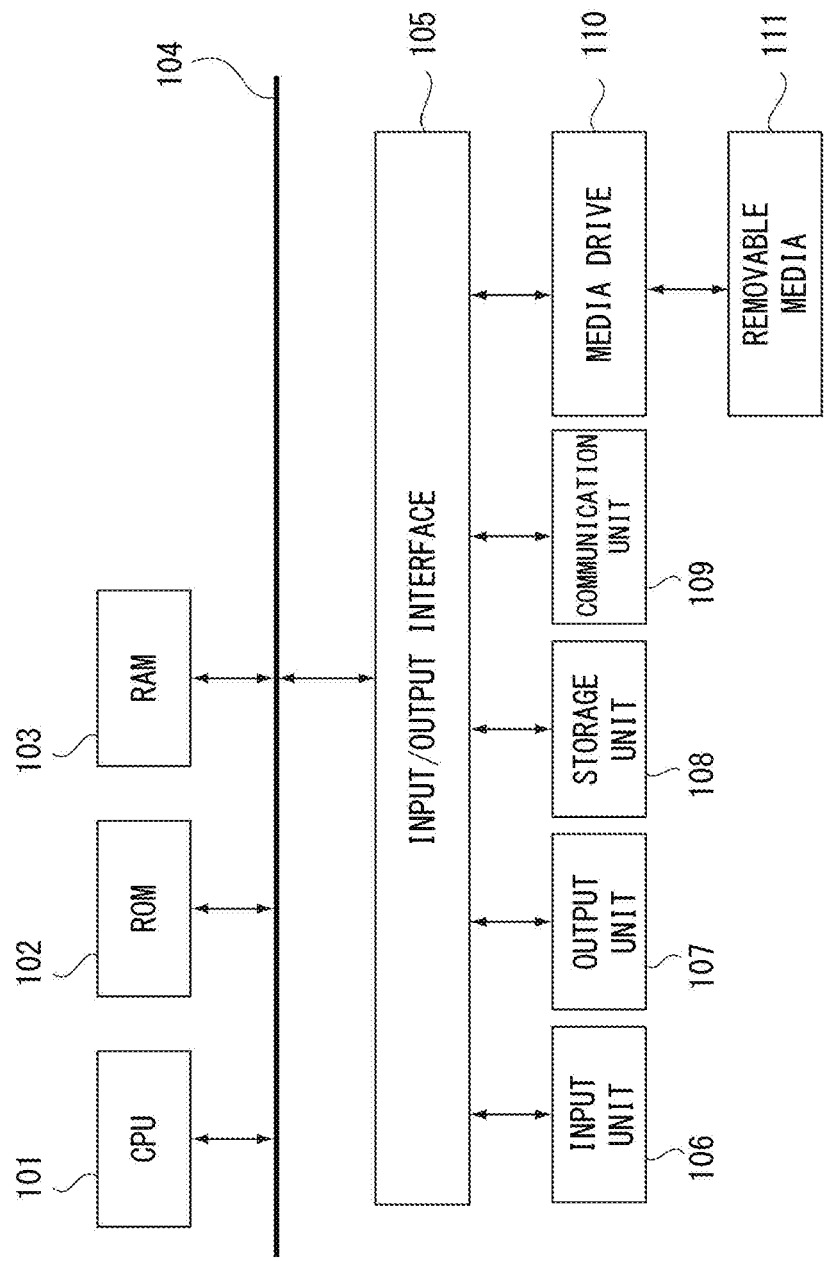
FIG. 2 is an explanatory view of a hardware configuration according to the embodiment.

Subsequently, FIG. 2 illustrates a hardware configuration of the information processing device constituting the server 1, the user terminals 2, the advertisement server 4, and the DB 3 illustrated in FIG. 1. The respective devices illustrated as the server 1, the user terminals 2, the advertisement server 4, and the DB 3 are achievable as computer devices as illustrated in FIG. 2 that can execute information processing and information communications.

In FIG. 2, a Central Processing Unit (CPU) 101 of the computer device executes various kinds of processes in accordance with programs stored in a Read Only Memory (ROM) 102 or programs loaded to a Random Access Memory (RAM) 103 from a storage unit 108. The RAM 103 also appropriately stores, for example, data necessary for the CPU 101 to execute various kinds of processes.

The CPU 101, the ROM 102, and the RAM 103 are mutually coupled via a bus 104. Input/output interfaces 105 are also coupled to this bus 104.

An input unit 106 including, for example, a keyboard, a computer mouse, and a touch panel, an output unit 107 including, for example, a display including, for example, a Liquid Crystal Display (LCD), a Cathode Ray Tube (CRT), and an organic Electroluminescence (EL) panel, and a speaker, the storage unit 108 configured of, for example, a Hard Disk Drive (HDD) and a flash memory device, and a communication unit 109 that performs a communication process and a communication between devices via the network N are coupled to the input/output interfaces 105.

A media drive 110 is coupled to the input/output interfaces 105 as necessary. A removable media 111, such as a magnetic disk, an optical disk, a magneto-optical disk, or a semiconductor memory, is appropriately mounted, and writing and reading of information on and out of the removable media 111 are performed.

In such a computer device, it is possible to upload and download data and programs through communications by the communication unit 109 and deliver and receive data and programs via the removable media 111.

The CPU 101 performing processing operations based on various kinds of programs executes information processing and communications necessary as the server 1, the user terminal 2, the advertisement server 4, and the DB 3.

Note that, the information processing device that configures the server 1, the user terminal 2, the advertisement server 4, and the DB 3 is not limited that the computer device as in FIG. 2 is configured alone, and may be configured such that a plurality of computer devices are systemized. The plurality of computer devices may be systemized by, for example, a Local Area Network (LAN) or may be disposed in a communicative state in a remote location by, for example, a Virtual Private Network (VPN) that uses the Internet or the like.

2. Functions of Server, User Terminal, Advertisement Server, and DB

Returning to FIG. 1, the following describes the functions of the server 1, the user terminal 2, the advertisement server 4, and the DB 3.

The server 1, the user terminal 2, and the advertisement server 4 are configured of one or a plurality of information processing devices. The respective functions of the server 1, the user terminal 2, and the advertisement server 4 are functions achieved by processes executed according to programs by the CPU 101 in the information processing device. Note that all or a part of processes of respective configurations described below may be achieved by hardware.

When the respective functions are achieved by software, it is not necessary that the functions are achieved by the respective independent programs. Processes of a plurality of the functions may be executed by one program, or one function may be achieved by a cooperation of a plurality of program modules. The respective functions may be dispersed in the plurality of information processing devices. Furthermore, one of the functions may be achieved by the plurality of information processing devices.

The server 1 includes a control unit 11 and a page generating unit 12.

The control unit 11 executes various processes achieving this service. In the embodiment, for example, the control unit 11 starts a Hypertext Transfer Protocol (HTTP) daemon. Meanwhile, a browser starts in the user terminal 2, and the user terminal 2 transmits a process request (HTTP request) to the server 1 via the browser. The control unit 11 in the server 1 transmits a process result (HTTP response) corresponding to the above-described process request to the user terminal 2. Thus, web page data described in web page description language is transmitted to the user terminal 2.

As the web page description language, for example, a HyperText Markup Language (HTML) and an Extensible HyperText Markup Language (XHTML) are used. The web page description language describes text data such as articles, image data such as images annexed to the articles, and arrangements and presented aspects (character color, font, size, decoration, and the like) of the data. As such web page description language, there is provided a plug-in script language to cause a terminal as a transmission destination to execute various processes in some cases. An example of the script language includes JAVASCRIPT™.

Then, the control unit 11 executes presentation control of a web page (screen) based on a process result on the browser of the user terminal 2 based on this web page data.

The control unit 11 receives information on a browsing state of content from the user terminal 2 and executes processes according to this received information. Specifically, when receiving the information indicating that the advertisement presented in the user terminal 2 passes over a predetermined period or more, the control unit 11 executes a process of updating point information (adding a point) corresponding to the relevant user in the DB 3.

The page generating unit 12 generates the web page transmitted to the user terminal 2. This web page is provided with a plug-in script language to cause a browser in the user terminal 2 to execute a process.

The user terminal 2 includes the browser and transmits a request signal (HTTP request) following HTTP to a server such as the server 1 to request for the web page. The user terminal 2 receives the web page transmitted from the server such as the server 1 according to the HTTP request and displays the web page on the browser. This allows the user to browse and operate the desired web page. The user terminal 2 executes a similar process on the web page received from another server such as the advertisement server 4.

The user terminal 2 executes various processes based on the plug-in script language in the received web page.

Specifically, the user terminal 2 executes an elapsed time determination process. The elapsed time determination process includes obtaining first time information at a timing of transitioning from a first window to another second window, obtaining second time information at a timing when a process in the first window is executable in a state after the transition to the second window, calculating an elapsed time from a difference between the first time information and the second time information, and executing a predetermined process according to a comparison between the elapsed time and a threshold time.

Here, the window means an area within a frame including the frame presenting the web page on the browser. The first window means the window presenting a service from the operation side of this service. The second window means a window presenting a link destination from the first window, and includes a window presenting a web page of another company, not limited to the operation side of this service. Another company other than the operation side of this service means, for example, a company that provides advertisement to this service.

Hereinafter, the first window is also referred to as a window WD1 and a second window as a window WD2.

According to a web page request from the user terminal 2, the advertisement server 4 transmits the web page data of the corresponding advertisement to the user terminal 2.

Specifically, when the user executes a selection operation on a certain advertisement link, the user terminal 2 requests web page data corresponding to the advertisement from the advertisement server 4 of the link destination. Then, the advertisement server 4 transmits the web page data corresponding to the advertisement to the user terminal 2.

Next, the following describes the DB 3 used by the server 1 having the above-described functions for determination of switch timing of a mode, selection of a distributed article, and the like. The DB 3 is constituted of, for example, a content DB 31 and a user DB 32. In addition to these DBs, the DB 3 may be constituted including a DB necessary for the server 1 to function as the server 1 for the Internet.

The content DB 31 stores various web page data constituting this service. Examples of the stored web page data include a login screen and a selection screen for an advertisement to be browsed. These web page data are, for example, structured document files, such as a Hyper Text Markup Language (HTML) and an Extensible Hyper Text Markup Language (XHTML).

The server 1 presents the images and the texts obtained from the content DB 31 on the browser in the user terminal 2.

For example, as illustrated in FIG. 3, the user DB 32 stores data regarding the users who possess the user terminal 2 for using this service. For example, attribute information such as an address, a name, a sex, and an age, an e-mail address, the point information, and elapse detection information of each content are associated with a user Identification (ID) as user identification information and stored. Note that the attribute information is not limited to the sex, the age, and an occupation but various kinds of attribute information such as a hobby, favorite food, and a character may be stored as attribute information.

Here, the point means a score for obtaining various benefits in the service operated by the server 1 by the use of the point. This point can be acquired as, for example, a privilege in the service. The user DB 32 stores values of the points acquired by the user up to the present as the point information.

The server 1 updates the point information stored in the user DB 32 according to the elapse detection information received from the user terminal 2.

As the elapse detection information of the presented content (advertisement), among achievement information indicating that this content has been presented for a predetermined period or more, browsing time information indicating a rough presentation period of this content, and the attribute information indicating a substance of the content and the like, at least one or more kinds of information are stored. The server 1 updates the user DB 32 according to the elapse detection information received from the user terminal 2.

The user registered with the user DB 32 is, for example, a user who has registered to enjoy various services including this service provided by the server 1, and the user ID only needs to be given according to this registration.

The DB 3 including the above-described respective DBs may be constructed in a server computer different from the server 1 or may be constructed in the server 1.

For convenience of illustration and explanation, while the respective DBs have been represented as the DB 3, the respective DBs, the content DB 31 and the user DB 32, may be achieved in any configuration as long as the server 1 is accessible. For example, a storage unit in a system identical to the server 1 may include all respective DBs, or a part or all of the respective DBs may be disposed, for example, in a separate computer system and a computer system in a remote location. Obviously, it is not necessary that each of the DBs is formed within one device (for example, one HDD). It is not necessary that each of the DBs is configured as each one DB. For example, information stored as the content DB 31 may be stored and managed by a plurality of content DBs (for example, content DB for login and content DB for dealing), or information stored as the content DB 31 may be stored and managed by the user DB 32. Each of the above-described DBs described in the embodiment are merely an example where the storage unit for information regarding processes in the embodiment is each configured as one DB.

3. Outline of Presentation Screen in User Terminal

The following describes an example of a screen presented in the user terminal 2 in a case of the use of this service according to the embodiment by the user with reference to FIG. 4 to FIG. 7.

Figure 4:
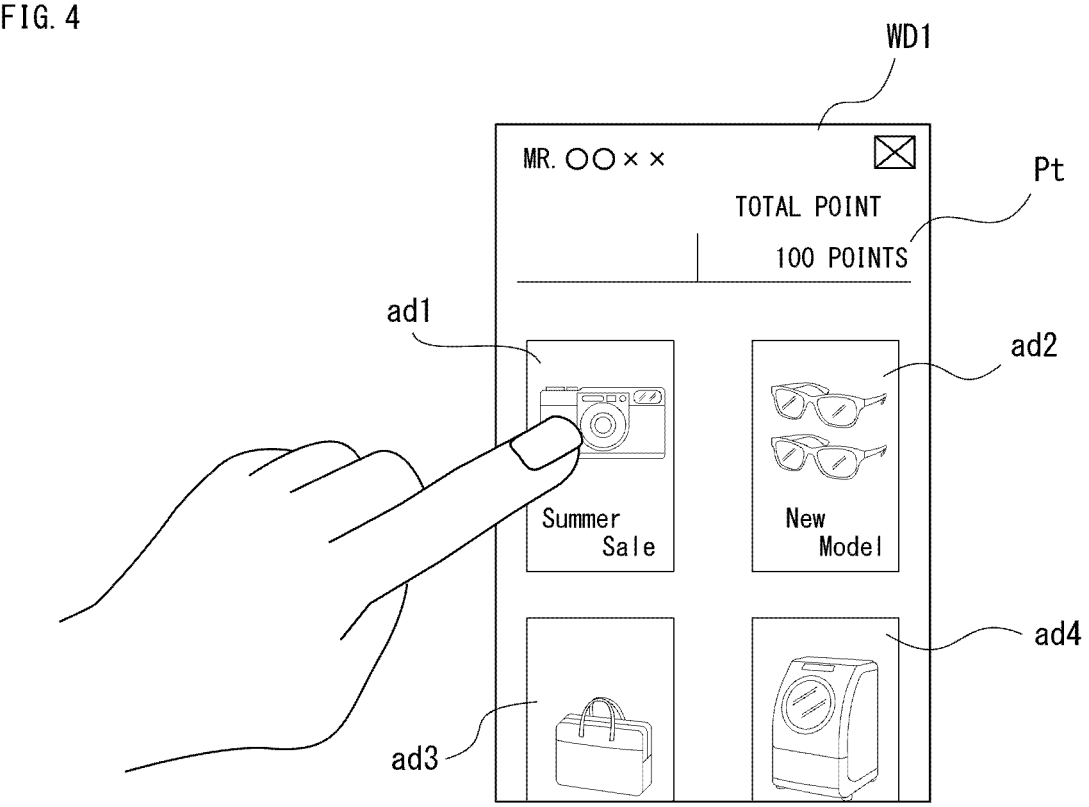
FIG. 4 is an explanatory view of an outline of a presentation screen in a user terminal according to the embodiment.

FIG. 4 illustrates a selection screen for advertisement browsable in this service. This selection screen is a screen presented on the browser in the user terminal 2 based on the web page data that the user terminal 2 received from the server 1. The embodiment assumes a portable smart device or a similar device as the user terminal 2 as one example.

The user who desires to use this service accesses the website provided by the server 1 from the user terminal 2 and executes a login process to enjoy various services provided by the server 1.

At this time, the user terminal 2 transmits login request information to the server 1, and then the server 1 executes the login process. Here, for example, a process such as an authentication process of a newly registered user and an already registered user is executed.

After proper completion of the login process, the user terminal 2 requests the web page data of this service from the server 1 and presents the advertisement selection screen as illustrated in FIG. 4 based on the web page data received from the server 1. Here, the advertisement selection screen is presented in the window WD1 on the browser in the user terminal 2.

The window WD1 presents various selectable advertisements ad1, ad2, ad3, and ad4 . . . . The user who selects and browses these advertisements for a certain period of time or more is allowed to obtain the point. In the embodiment, the certain period of time is set to, for example, five seconds. Various settings such as 10 seconds, 30 seconds, and one minute are possible as the browsing time, in addition to five seconds.

The currently obtained point is displayed in a point display area PT.

The advertisements ad1, ad2, ad3, and ad4 . . . each include corresponding advertisement link. When the user executes the selection operation such as a touch operation on, for example, the advertisement ad1, the user terminal 2 requests the web page data corresponding to the advertisement from the advertisement server 4 of the link destination and receives the web page data from the advertisement server 4. The advertisement server 4 is not limited to the server 1 as a provision source of this service and is, for example, a server of another company that provides an advertisement to this service.

Note that the advertisement server 4 may be a server of the operation side of this service. Various aspects are possible as the advertisement, such as still pictures, moving images, and sound therewith.

Figure 5:
FIG. 5 is an explanatory view of an outline of the presentation screen in the user terminal according to the embodiment.

As illustrated in FIG. 5, the browser in the user terminal 2 presents the advertisement based on the web page data received from the advertisement server 4 in the new window WD2.

At this time, a focus on the browser in the user terminal 2 moves from the window WD1 to the window WD2. That is, a process is executed mainly on the window WD2 based on the web page data received from the advertisement server 4.

In a state of the focus on the browser in the user terminal 2 moving from the window WD1 to the window WD2, the browser process in the window WD1 side starts measuring a period during which the window WD2 is presented on the browser.

Figure 6:
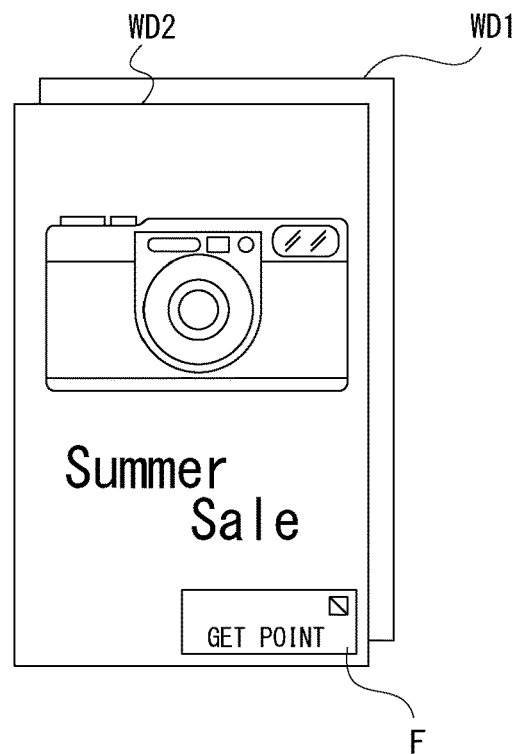
FIG. 6 is an explanatory view of an outline of the presentation screen in the user terminal according to the embodiment.

When this presentation period reaches the certain period of time or more, the point is given to the user who has browsed the advertisement for the predetermined period or more. As illustrated in FIG. 6, a window F notifying the giving of the point is presented by, for example, push notification.

Figure 7:
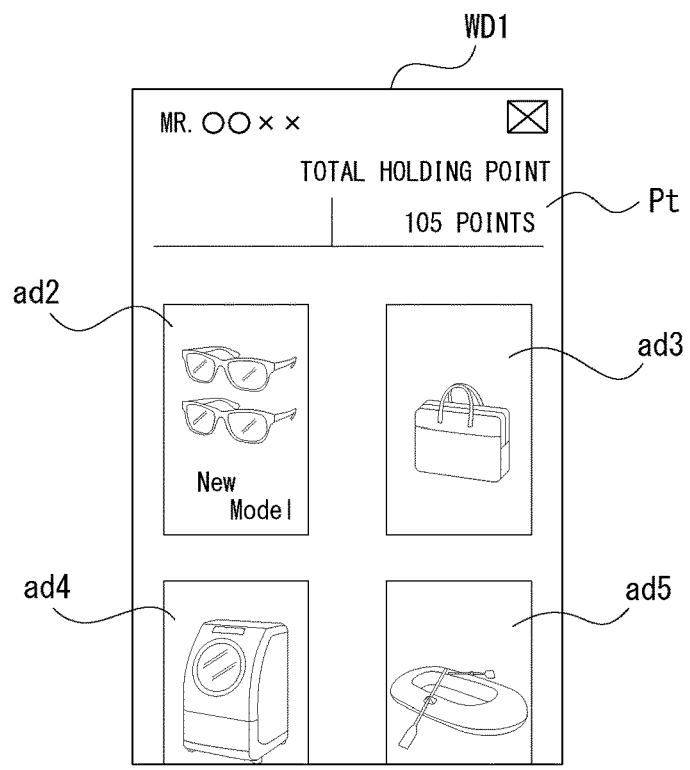
FIG. 7 is an explanatory view of an outline of the presentation screen in the user terminal according to the embodiment.

When the user finishes browsing the advertisement and returns the focus to the window WD1 by an operation such as closing the window WD2, as illustrated in FIG. 7, a value of the point after the giving is displayed in the point display area PT. Further, the advertisement ad1 disappears from the selectable advertisements in the window WD1 and the advertisements ad2, ad3, ad4, and ad5 . . . are presented. Note that the advertisement ad1 once browsed may be presented so as to be browsable again.

The basic flow of giving the point brought by browsing the advertisement in this service has been described above.

Figure 8:
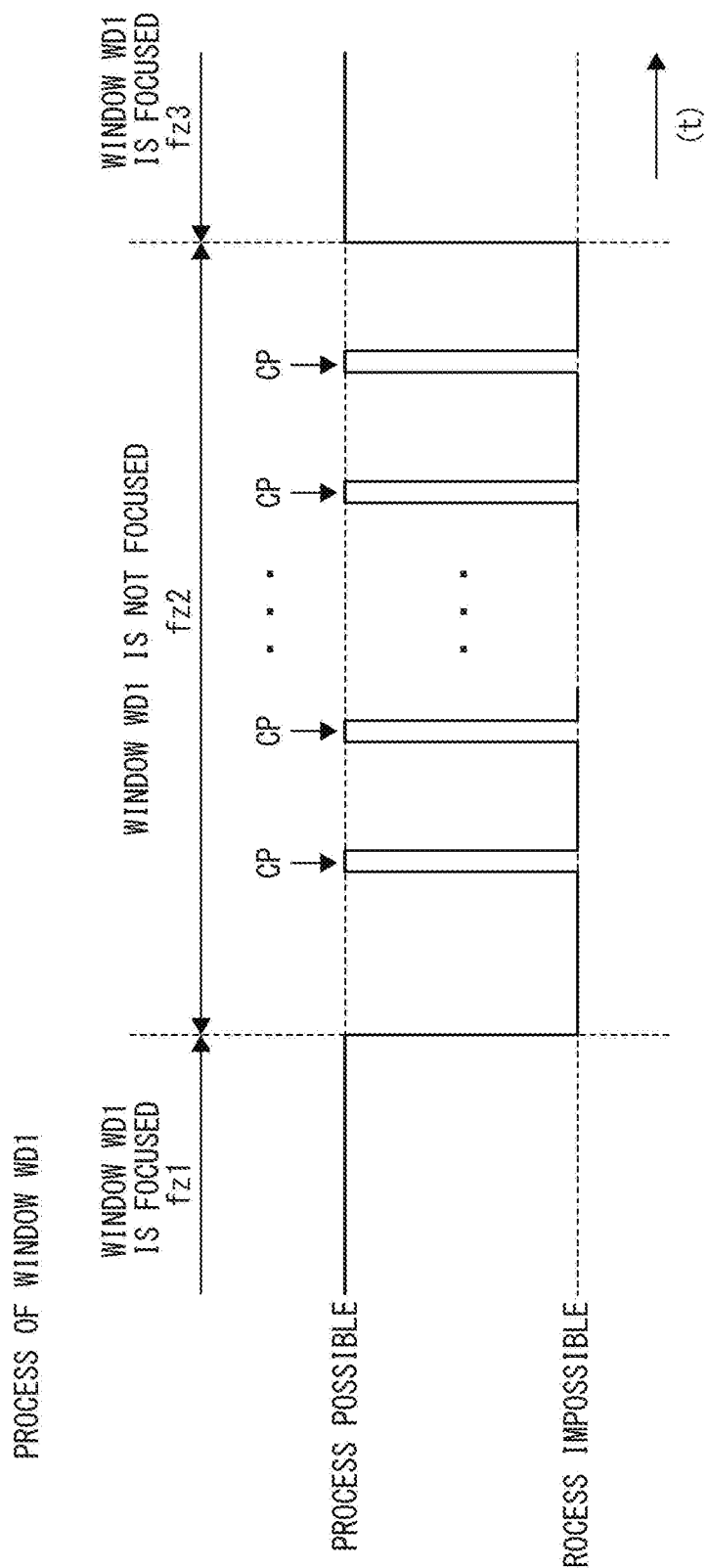
FIG. 8 is an explanatory view of an outline of a browser process in a window according to the embodiment.

Here, the following describes an outline of the browser process of the window with reference to FIG. 8. FIG. 8 illustrates availability of the browser process according to the focus state to a certain window on the browser. FIG. 8 describes the window WD1 as illustrated in FIG. 4 and FIG. 5 as one example. The horizontal axis indicates an elapsed time (t) progressing rightward from the left.

First, in a state of the window WD1 being focused (indicates a period fz1 and a period fz3 and hereinafter also referred to as a focus ON state), the user terminal 2 can continuously execute processes on the window WD1 through the browser.

On the other hand, in a state of the window WD1 being unfocused (indicates a period fz2 and hereinafter also referred to as a focus OFF state), due to specifications of the browser, the user terminal 2 cannot continuously execute processes on the unfocused window WD1 through the browser. That is, the user terminal 2 mainly executes processes on the focused window WD2 through the browser.

The focus OFF state of the window WD1 means a state where, for example, the web page jumps from the window WD1 to the window WD2 of the link destination and the browser focuses on the window WD2.

In such state, the process of the window WD1 side cannot continuously monitor the period during which the window WD2 is presented on the browser through the browser. Therefore, to give the point according to the elapse of the browsing time of the advertisement in this service, grasping the browsing state of the window WD2 from the window WD1 side was difficult.

However, due to the specifications of the browser, there are provided a plurality of timings CP at which the process from the browser becomes possible also on the unfocused window WD1 at every short interval, around one second.

Therefore, using such specifications of the browser, this technique executes a process for confirming whether the window WD2 is presented on the browser, a process for obtaining current time information, and a similar process by the browser process on the window WD1 side at each timing CP. The browser determines whether or not the presentation period of the window WD2 passes over the predetermined period from this information and determines whether to give the point or not according to the determination result.

Details of the browser process in the user terminal 2 based on the window WD1 will be described later.

Then, when the window WD1 turns to the focus ON again (period fz3), the user terminal 2 can continuously execute the processes on the window WD1 again through the browser.

The case where the window WD1 turns to the focus ON again possibly includes cases where, for example, the selection operation on the browser by the user moves the focus to the window WD1 and closing the window WD2 moves the focus to the window WD1.

4. Outline of Process of Browsing State Storage System

Figure 9:
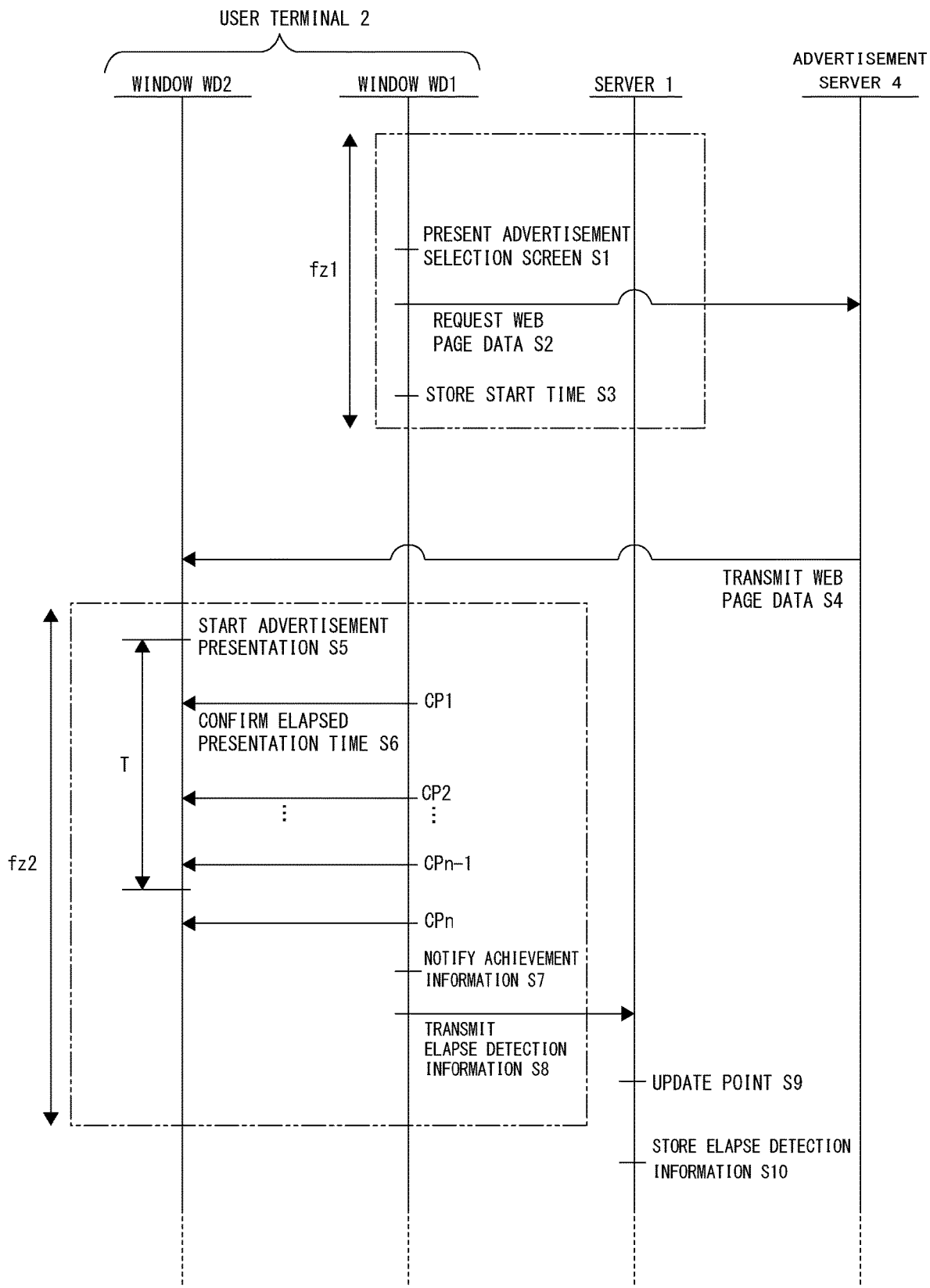
FIG. 9 is an explanatory view of a flow of processes of an entire system according to the embodiment.

Next, the following describes the outline of the browsing state storage system used in this service with reference to FIG. 9. FIG. 9 illustrates one example of a flow of processes executed by the server 1, the user terminal 2, and the advertisement server 4.

The window WD1 and the window WD2 illustrated in FIG. 9 are windows presented on the browser in the user terminal 2. Similarly to FIG. 8, the period during which the browser focuses on the window WD1 is indicated as the period fz1 and the period during which the browser focuses on the window WD2 is indicated as the period fz2.

First, the user who desires to use this service accesses the website provided by the server 1 from the user terminal 2 and executes the login process to enjoy various services provided by the server 1.

After proper completion of the login process, the user terminal 2 presents the advertisement selection screen as illustrated in FIG. 4 based on the web page data received from the server 1 at Step S1. Here, the advertisement selection screen is presented in the window WD1 on the browser in the user terminal 2. At this time, the browser in the user terminal 2 focuses on the window WD1. That is, the period fz1 is started.

Then, when the user terminal 2 detects the selection operation of the advertisement by the user in the advertisement selection screen, the user terminal 2 transmits a web page data request of the selected advertisement to the advertisement server 4 that provides this advertisement at Step S2. Further, the user terminal 2 stores the time information of when the web page data request is transmitted to the advertisement server 4 as an advertisement presentation start time in, for example, the RAM 103 in FIG. 2 and an internal register at Step S3.

The advertisement server 4 that has received this web page data request of the advertisement transmits this requested web page data to the user terminal 2 at Step S4. When the user terminal 2 receives this web page data, the user terminal 2 presents this web page of the advertisement in the window WD2 on the browser at Step S5.

At this time, the browser in the user terminal 2 moves the focus from the window WD1 to the window WD2. That is, the period fz1 is terminated and the period fz2 is started.

The process of browser in the window WD1 is restricted during the period fz2. Specifically, the process of browser in the window WD1 is possible only at every timing CP, which is the short interval around one second. FIG. 9 illustrates timings CP1, CP2, . . . , CPn-1, and CPn as one example of timing. n indicates a natural number.

The user terminal 2 executes the process of browser in the window WD1 at every timing CP at Step S6. This process of browser monitors whether the window WD2 is present and obtains the current time information. The browser in the user terminal 2 calculates a difference between the advertisement presentation start time and the current time with the window WD2 present and determines whether a predetermined period T has elapsed from when the advertisement screen (window WD2) is presented.

Here, the user terminal 2 determines that the predetermined period T has elapsed from when the advertisement screen is presented in the window WD2 in the browser process at, for example, the timing CPn.

Then, the user terminal 2 executes a process of displaying a notification of the achievement information on the browser during the timing CPn at Step S7. When the predetermined period T has elapsed, the user terminal 2 transmits the elapse detection information to the server 1 at Step S8.

The server 1 that has received this elapse detection information updates the point information in the user DB 32 to point information after giving the point at Step S9. The server 1 stores this elapse detection information in the user DB 32 at Step S10.

When the focus is moved to the window WD1 again by closing the window WD2 and the like, the user terminal 2 transmits the request for web page data after the point update to the server 1.

Then, after receiving the web page data after update from the server 1, the user terminal 2 presents the web page after update as illustrated in FIG. 7 in the window WD1.

The outline of the browsing state storage system used for this service has been described above.

5. Processes by Server and User Terminal

The following describes the processes executed by the user terminal 2 and the server 1 to achieve behaviors of the browsing state storage system according to the embodiment with reference to FIG. 10 to FIG. 13.

Here, it is assumed that the user who desires to use this service has properly completed the above-described login process to the server 1.

Figure 10:
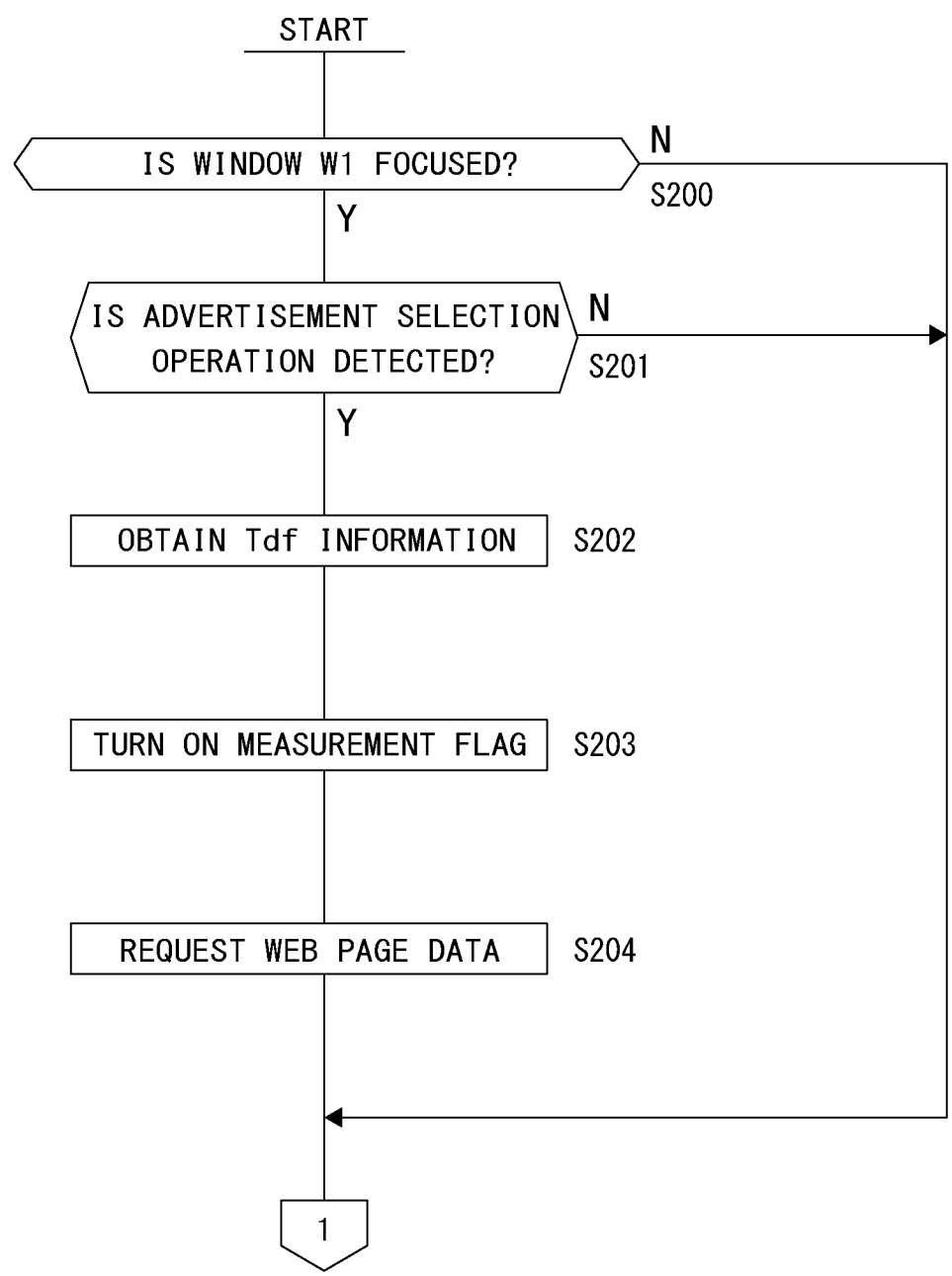
FIG. 10 is an explanatory view of a flow of processes by the user terminal according to the embodiment.
Figure 11:
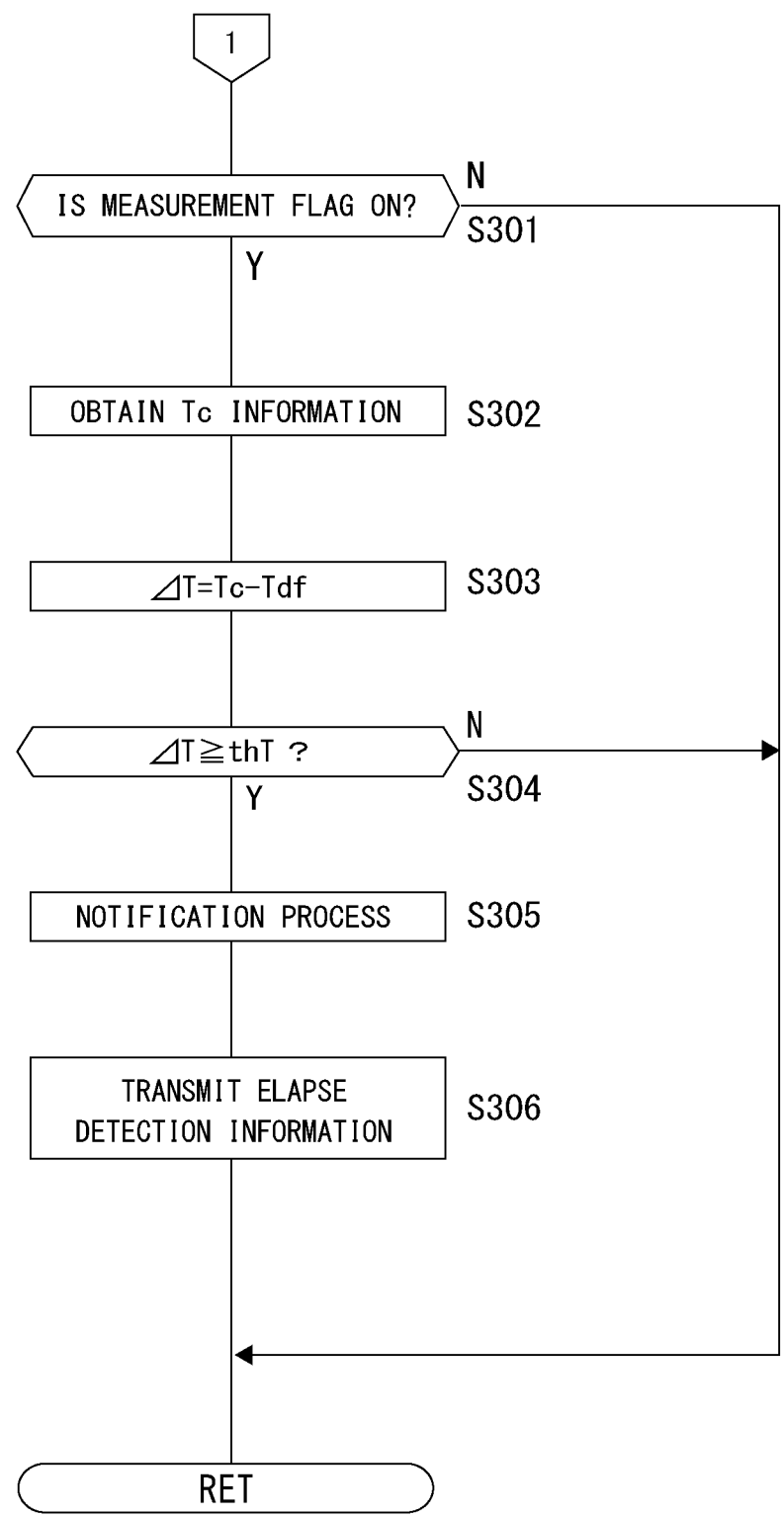
FIG. 11 is an explanatory view of a flow of processes by the user terminal according to the embodiment.

First, with reference to FIG. 10 and FIG. 11, the following describes a first example of processes executed by the user terminal 2 according to the focus state of the browser.

Processes of FIG. 10 and FIG. 11 are executed by the user terminal 2 based on the plug-in program in the web page data in the window WD1. While the window WD1 is focused on the browser, the user terminal 2 repeatedly executes the processes of FIG. 10 and FIG. 11 continuously.

Meanwhile, while the window WD1 is unfocused on the browser, the processes by the user terminal 2 based on the plug-in program in the window WD1 are restricted. Therefore, the user terminal 2 executes these processes during the timings CP as illustrated in FIG. 8.

In FIG. 10, the user terminal 2 determines whether or not the window WD1 is focused on the browser at Step S200. That is, the user terminal 2 determines whether the process can be executed based on, for example, the plug-in script language in the web page data presented in the window WD1 through the browser.

At Step S200, with the window WD1 unfocused on the browser, since the processes by the user terminal 2 based on the window WD1 are restricted, the user terminal 2 terminates the processes of FIG. 10 and advances the process to FIG. 11.

With the window WD1 focused on the browser, the user terminal 2 advances the process from Step S200 to Step S201. In this state, the advertisement selection screen as illustrated in FIG. 4 is presented on the browser in the user terminal 2 based on the web page data received from the server 1.

At Step S201, the user terminal 2 determines whether or not the advertisement selection operation by the user is detected. When this advertisement selection operation is not detected, the user terminal 2 terminates the processes of FIG. 10 and advances the process to FIG. 11.

When this advertisement selection operation is detected at Step S201, the user terminal 2 advances the process to Step S202 to obtain current time information Tdf, and stores the current time information Tdf to, for example, the RAM 103 in FIG. 2 and the internal register.

Additionally, the user terminal 2 executes a process of turning ON a measurement flag at Step S203. The ON measurement flag suggests a state where the web page of the advertisement server 4 is basically presented in the window WD2. That is, the advertisement browsing time by the user is measured by the browser process in the unfocused window WD1 in the user terminal 2.

Afterwards, the user terminal 2 transmits the request for this web page data to the advertisement server 4 of the link destination for the selected advertisement at Step S204. When the user terminal 2 receives this web page data from the advertisement server 4, the user terminal 2 presents the advertisement screen like FIG. 5 in the window WD2 on the browser. At this time, the focus on the browser in the user terminal 2 is moved from the window WD1 to the window WD2, and the processes on the browser in the window WD1 are restricted.

At the completion of the process of Step S204, the user terminal 2 terminates the processes of FIG. 10 and advances the process to FIG. 11. Execution of the processes of Steps S202 and S203 prior to Step S204 allows preventing the focus from being moved from the window WD1 to the window WD2 before obtaining the time information of the time Tdf and executing the process of turning ON the measurement flag. That is, the required processes are executable prior to the restriction in the processes in the window WD1 on the browser by the user terminal 2.

Next, the user terminal 2 determines whether the measurement flag is ON at Step S301 of FIG. 11. With the measurement flag OFF, since the time information of the current time Tdf required to measure a focus period of the window WD2 is not obtained (Step S202 to Step S203 in FIG. 10), the user terminal 2 terminates the processes of FIG. 11.

With the measurement flag ON at Step S301, the user terminal 2 advances the process to Step S302.

The process here is to measure the period during which the window WD2 is focused on the browser based on the plug-in program in the window WD1 by the user terminal 2. That is, the process is a process that the user terminal 2 determines whether or not the user has browsed the advertisement presented in the window WD2 for the predetermined period or more.

At Step S302, the user terminal 2 obtains time information Tc at the timing CP of FIG. 9. Afterwards, at Step S303, the user terminal 2 calculates a difference ΔT between the obtained time information Tc and the time information Tdf stored in the process of FIG. 10.

At Step S304, the user terminal 2 determines whether or not the difference ΔT is a threshold thT or more. The threshold thT is a presentation period of advertisement preset as a reference for giving the point. The threshold thT is, for example, five seconds.

With the difference ΔT of less than the threshold thT at Step S304, the user terminal 2 determines that the advertisement browsing time by the user has not yet reached to the level to give the point and therefore the user terminal 2 terminates the processes illustrated in FIG. 11.

On the other hand, with the difference ΔT of the threshold thT or more, the user terminal 2 advances the process from Step S304 to Step S305. At Step S305, the user terminal 2 executes a process of notifying the advertisement browsing time by the user has reached the point giving level. For example, the user terminal 2 displays the push notification as illustrated in FIG. 6 on the browser to notify that the browsing time required to give the point to the user has elapsed. Various methods are possible as this notification, and the method may be a notification by sound and vibration emitted from the user terminal 2 or may be a display on the window WD1 when the focus is returned to the window WD1.

Subsequently, at Step S306, the user terminal 2 transmits the elapse detection information containing information that the difference ΔT is the threshold thT or more, that is, the achievement information indicating that the presentation period of the advertisement has been presented for the predetermined period or more to the server 1. Thus, the server 1 that has received this information gives the point to the user. Details of a point giving process will be described later.

The user terminal 2 that has terminated the measurement of the browsing time resets the difference ΔT at Step S307, executes a process of turning OFF the measurement flag, and terminates the processes of FIG. 11.

Figure 12:
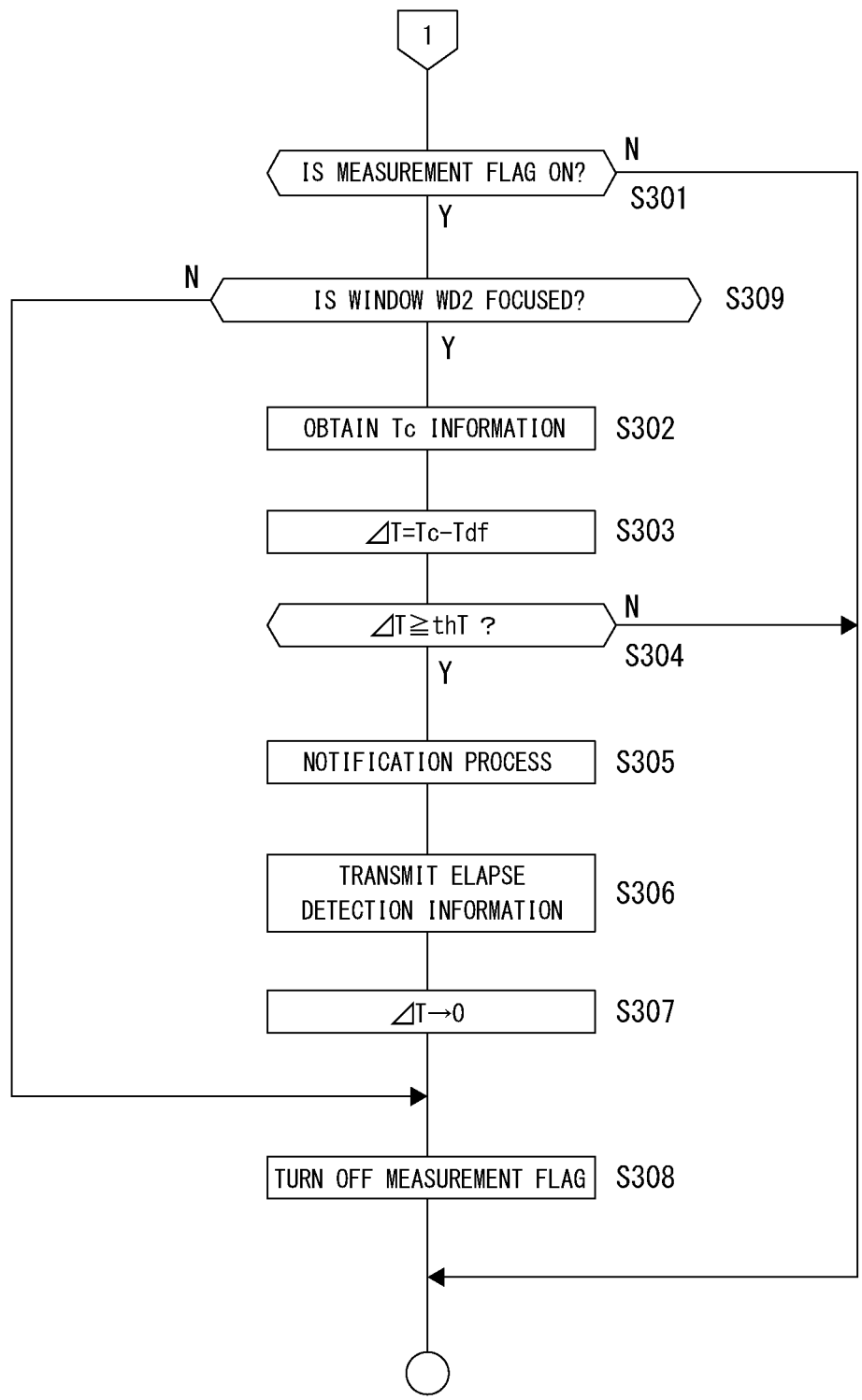
FIG. 12 is an explanatory view of a flow of processes by the user terminal according to the embodiment.

Next, the following describes a second example of processes executed by the user terminal 2 with reference to FIG. 10 and FIG. 12.

Even while the window WD1 is unfocused, the focus of the browser is not necessarily on the window WD2 and another window is focused in some cases. In this case, a possibility of the user browsing the advertisement is considered as low.

Accordingly, in this example, the period during which the browser in the user terminal 2 focuses on the window WD2 is determined as a period during which the user browses the advertisement. Note that the following omits descriptions on processes similar to those of the above-described first example.

First, after terminating the above-described processes of FIG. 10, the user terminal 2 determines whether the measurement flag is ON at Step S301 of FIG. 12. When the measurement flag is OFF, the user terminal 2 terminates the processes of FIG. 12.

With the measurement flag ON, the user terminal 2 advances the process to Step S309 and determines whether or not the window WD2 is focused on the browser.

When the user terminal 2 determines that the window WD2 is unfocused, the user terminal 2 determines that the user does not browse the advertisement, advances the process from Step S309 to Step S308 to execute a process of turning OFF the measurement flag, and terminates the processes of FIG. 12.

When the user terminal 2 determines that the window WD2 is focused at Step S309, the user terminal 2 obtains the time information Tc at Step S302 and calculates the difference ΔT between the time information Tc and the time information Tdf at Step S303.

At Step S304, the user terminal 2 determines whether or not the difference ΔT is the threshold thT or more.

Afterwards, with the difference ΔT of less than the threshold thT at Step S304, the user terminal 2 terminates the processes illustrated in FIG. 12. With the difference ΔT of the threshold thT or more, the user terminal 2 executes a process of notifying that the browsing time has reached the point giving level at Step S305.

Subsequently, at Step S306, the user terminal 2 transmits that the difference ΔT is the threshold thT or more to the server 1, of resetting executes a process to reset the difference ΔT at Step S307, turns OFF the measurement flag at S308, and terminates the processes of FIG. 12.

Figure 13:
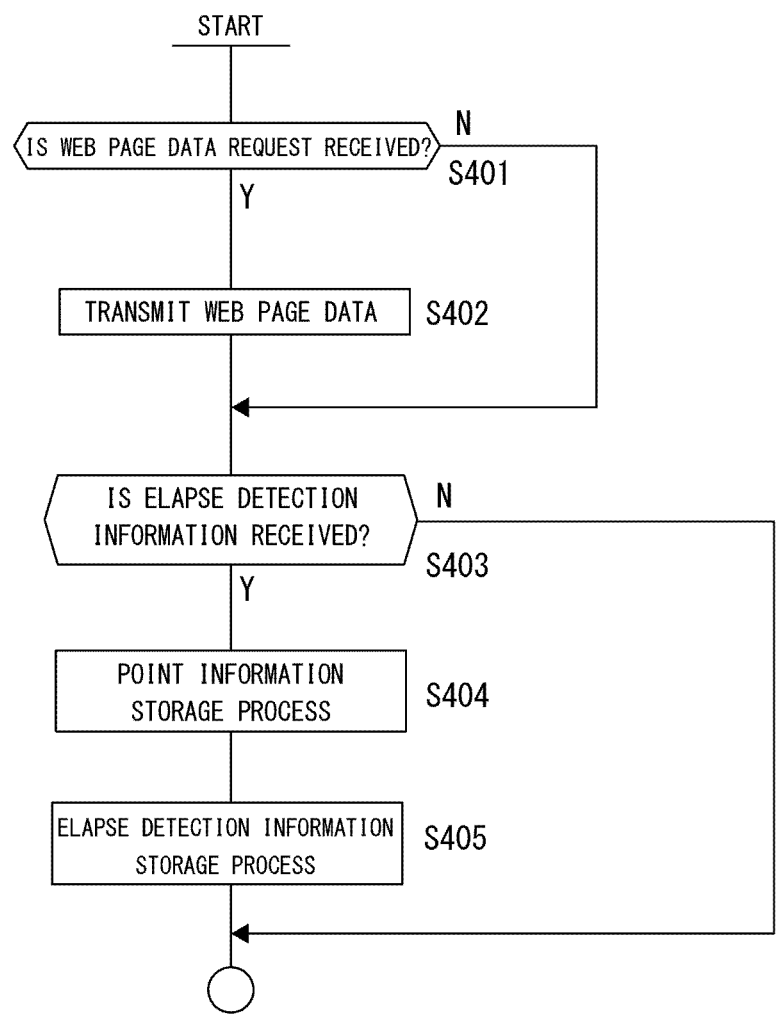
FIG. 13 is an explanatory view of a flow of processes by a server according to the embodiment.

Finally, the following describes the processes by the server 1 that has received the information indicating that the advertisement browsing time has reached the point giving level from the user terminal 2 with reference to FIG. 13. The server 1 always executes the processes of FIG. 13.

First, the server 1 determines whether or not the server 1 has received the web page data request from the user terminal 2 at Step S401. Here, the web page data requested by the user terminal 2 is to be presented in the window WD1 on the browser.

The server 1 receiving this web page data request advances the process from Step S401 to Step S402 to obtain the corresponding web page data from the content DB 31 and transmits the web page data to the user terminal 2. The plug-in program to cause the user terminal 2 to execute the processes from FIG. 10 to FIG. 12 on the browser is in this web page data.

Note that in a case where the server 1 functions as the advertisement server 4, there may be a case where the server 1 transmits the web page data regarding the advertisement and the like to be presented in the window WD2 to the user terminal 2 according to the request from the user terminal 2.

When the server 1 terminates the process of Step S402 or does not receive the web page data request at Step S401, the server 1 advances the process to Step S403.

The server 1 determines whether or not the server 1 has received the elapse detection information from the user terminal 2 at Step S403. Here, the elapse detection information is transmitted from the user terminal 2 at Step S306 of FIG. 11 or FIG. 12 and is information including the above-described achievement information, browsing time information, attribute information, and similar information.

The server 1 that has received this elapse detection information executes a process of storing the point information at Step S404. The server 1 adds the point corresponding to the browsed advertisement and updates the point information in the user DB 32 in FIG. 3.

The server 1 executes a process of storing the elapse detection information at Step S405. The server 1 stores the elapse detection information of the user regarding the advertisement in the user DB 32. By thus storing the elapse detection information of each advertisement of the user, the various services provided by the server 1 can provide comfortable services reflecting this information to each user.

After Step S405 or when the elapse detection information has not been received, the server 1 terminates the processes illustrated in FIG. 13.

Note that, in addition to the processes illustrated in FIG. 13, the server 1 executes various processes according to the requests from the user terminal 2, such as the login process according to the login request from the user terminal 2.

<Supplement>

Some tabbrowsers, so-called web browser behaving on a PC and having a function behaving with a plurality of tabs opened, continue a behavior of a client script included in the web page displayed in a tab window even when the tab window is unfocused and inactive. In contrast to this, it is considered that, in a tabbrowser behaving in a smart phone, a script does not behave at all in an unfocused tab window.

Here, for example, to provide a service that gives the point when the user has browsed the displayed advertisement selected by the user in the smart phone for a predetermined period, software referred to as a so-called native application can achieve the service. However, providing the service as web application behaving on the web browser not requiring preliminary download of a program was difficult. That is, to provide such service as the web application in the smart phone, in a case where the advertisement is selected in the window displaying the web page provided by a provider of the service, a new window opens, and the focus is moved to the new window, since the new window is a page beyond control of the service provider, a program measuring and determining whether or not the predetermined period has elapsed is inexecutable on the page. Moreover, as described above, it is considered that, in the tabbrowser behaving on the smart phone, the script does not behave in the unfocused tab window; therefore, the elapse of the predetermined period was not able to be measured and determined in the page of the service provider that has lost the focus.

However, the inventors have found through experiments that it cannot be said that the client script does not completely behave even in the tab window that has lost the focus on the tabbrowser in the smart phone.

The following shows results of the measured timings at which the tab window losing the focus behaves by causing a client script created for experiment to behave on the tabbrowser behaving in a certain smart phone (unit:msec).

506
942
999
1000
1001
999
1000
1000
1000
1000

That is, it has been found that, in the tabbrowser in this smart phone, a process timing at which the client script behaves is given even in the tab window that has lost the focus, once around 0.5 seconds at first. Although the timing gradually lengthens, the timing is given around once for one second at least for several ten seconds.

The following shows experimental results of similar experiment conducted on a tabbrowser behaving in another smart phone with different Operating System (OS) (unit: msec).

364
250
250
251
250
969
1000
999
1001
1000
999
1000
1001

As was expected, it has been found that, in the tabbrowser in this smart phone as well, even after the tab window loses the focus, a process timing is given around once for one second at least for several ten seconds.

This embodiment uses this property to ensure providing the above-described service.

6. Summary and Modifications

The server 1 described in the above-described embodiments and the like includes the page generating unit 12 and the presentation control unit 11. The page generating unit 12 generates the web page data of the first window (window WD1) including the program causing the terminal device (user terminal 2) to execute the elapsed time determination process for obtaining the first time information at the timing (S201 of FIG. 10) of the transition from the first window (window WD1) to the second window (window WD2) (S202); obtaining the second time information Tc at the timing CP during which the process in the first window (window WD1) is executable in the state after the transition to the second window (window WD2) (S302 of FIG. 11); calculating the elapsed time ΔT from the difference between the first time information Tdf and the second time information (S303); and executing the predetermined process according to the comparison between the elapsed time ΔT and the threshold time thT (S304 to S306). The presentation control unit 11 executes the process for transmitting the web page data to the terminal device (user terminal 2) and causing the terminal device (user terminal 2) to present the web page data.

Thus, the information processing device (server 1) generates page data information with the plug-in program for executing the above-described processes and transmits the page data information to the terminal device (user terminal 2). This allows measuring the presentation period of the second window (window WD2) by obtaining the time information Tc at the timing CP during which the process is executable even when the processes on the first window (window WD1) side in the terminal device (user terminal 2) are restricted.

Due to the specifications of the browser provided with the user terminal 2, constant execution of the plug-in program in the web page data presented in the window WD1 is restricted in the window WD2 presented based on the web page data received from the server of another company.

However, like the present invention, due to the specifications of the browser, obtaining the current time information Tc using the momentary timings CP during which the processes on the window WD1 side are permitted as illustrated in FIG. 8 allows calculating the period from when the focus is moved from the window WD1 to the window WD2.

Therefore, even under the situation where the processes on the window WD1 side are restricted, the presentation situation of the window WD2 can be managed.

Additionally, since the presentation period of the window WD2 can be measured utilizing the mechanism of the browser without conflicting with the specifications of the browser, an extra process needs not to be incorporated. Therefore, a load of design can be reduced and further a processing load on the user terminal 2 can be reduced.

The following is possible. The server 1 (page generating unit 12) generates the web page data of the first window (window WD1) including the program causing the terminal device (user terminal 2) to execute the process for determining whether the second window (window WD2) is focused (S309 of FIG. 12), and when determining that the second window (window WD2) is unfocused terminating the elapsed time determination process (FIG. 12).

Accordingly, with the second window (window WD2) unfocused, the terminal device (user terminal 2) does not measure the presentation period of the second window (window WD2).

Even in a case where the window WD1 is unfocused on the browser in the user terminal 2, the window WD2 is not necessarily focused. For example, the user possibly opens another window and browses content and the like of a service other than this service.

Therefore, at the timing CP during which the process in the window WD1 is permitted, the user terminal 2 also determines whether or not the window WD2 is focused to ensure improvement in accuracy of the determination whether or not the advertisement presented in a window WD of another company is browsed.

Additionally, the following is possible. The server 1 (page generating unit 12) generates the web page data of the first window (window WD1) including the program causing the terminal device (user terminal 2) to execute the process for, with the second window (window WD2) focused, when the focus is moved from the second window (window WD2) to the first window (window WD1), terminating the elapsed time determination process (FIG. 12).

Accordingly, when that focus is returned to the first window (window WD1), the terminal device (user terminal 2) does not measure the presentation period of the second window (window WD2).

Thus, in a case where the focus is lost from the window WD2 before the elapsed time passes over the predetermined threshold thT, the browsing elapsed time of the advertisement can be reset. This allows further accurately measuring the browsing time of the window WD2 by the user during, for example, a campaign giving a privilege when the user continuously browses the content such as the advertisement.

Note that when the window WD2 does not gather the focus any further, the embodiment resets the browsing time of the content presented in the window WD2. However, the present invention may record a period from when the window WD2 gathers the focus until not gathering the focus, add the previously recorded period when the window WD2 is focused again, and then measure the elapsed time.

Additionally, the following is possible. When the elapsed time Tc has passed over the threshold thT or more, the elapsed time determination process (FIG. 11, FIG. 12) in the server 1 (page generating unit 12) includes the program (S306) causing the terminal device (user terminal 2) to execute the process for transmitting this elapse information to the information processing device (server 1).

Obtaining the elapse information of the presentation period ΔT of the second window (window WD2) from the terminal device (user terminal 2) allows the information processing device (server 1) to execute a process according to this elapse information.

This allows obtaining information that the respective users using this service how often browse what sort of advertisement. This allows grasping a trend such as an interest of each user. Therefore, this information can be effectively utilized to provide a further convenient service reflecting a preference of the user in this service and various services provided by the server 1.

The following is possible. The server 1 that has received the elapse information updates the information on the user (point information). The information on the user includes not only the point information but also the elapse detection information.

According to the presentation of the content presented in the second window (window WD2) for the predetermined period, the information processing device (server 1) can give the privilege to the user considered as browsing this content (advertisement). Accordingly, this service can be utilized while giving more fun to the users.

The following is possible. The server 1 (page generating unit 12) generates web page data of the first window (window WD1) including the program causing the terminal device (user terminal 2) to execute the process (S306 of FIG. 11 and FIG. 12) for, when the elapsed time Tc reaches the threshold thT or more, transmitting the information on the content (advertisement) presented in the second window (window WD2) to the information processing device (server 1).

This allows the information processing device (server 1) to obtain the content information browsed for the period of the threshold thT or more. This allows grasping a trend such as an interest of each user.

Additionally, the following is possible. The server 1 generates the web page data of the first window (window WD1) including the program causing the terminal device (user terminal 2) to execute the process (S202 of FIG. 10) for, when receiving the operation information to transition from the first window (window WD1) to the second window (window WD2), transmitting the request of the web page data presented in the second window (window WD2) after obtaining the first time information Tdf.

This allows obtaining the first time information Tdf before the terminal device (user terminal 2) receives the web page data presented in the second window (window WD2) and presents this web page in the second window (window WD2).

The presentation of the received web page data in the window WD2 restricts the process on the window WD1 side, possibly failing to obtain the first time information Tdf appropriately. Accordingly, obtaining the first time information Tdf before the user terminal 2 presents the web page data in the window WD2 allows preventing malfunction.

The following is possible. The process (FIG. 10 to FIG. 12) of the program executed by the terminal device (user terminal 2) is executed on the browser in the terminal device (user terminal 2).

The present invention is to solve a problem that the process by the program on the window WD1 side is restricted while the window WD2 is presented due to the specifications of the browser.

Note that while the embodiment uses the advertisement as one example of the content and describes a browsing time measuring system of this presented advertisement, the content of the present invention is not limited to the advertisement. As long as the content is, for example, a text, diagram and table, an image, and an audio regarding a predetermined matter, a length and a substance of the content are not especially limited. Examples of the content include news, a review, a blog, and a recipe.

While in the embodiment, when the browsing time reaches the threshold thT or more, the user terminal 2 transmits the notification to the server 1, this should not be limited to this threshold thT. When the measurement process is terminated, the user terminal 2 may transmit information on all periods during which the window WD2 is focused to the server 1.

This allows the server 1 to obtain the information that each user using this service browses what sort of content for how long period. Therefore, this information can be effectively utilized to provide a further convenient service reflecting a preference of the user in this service and various services provided by the server 1.

Such service of measuring the focus period of the window WD2 is, for example, possibly a news article providing service and a recipe providing service. By grasping the period during which the news article and recipe information provided from the advertisement server 4 are presented in the window WD2 by the process based on the web page data on the service provision side, what kind of news and cooking the user is interested in can be estimated from the browsing time.

The processes described for the embodiments may be independent processes, or each process may be executed in combination. Note that various aspects besides the above-described examples are considered as the combinations of the embodiments.

7. Program and Storage Medium

While the server 1 as the embodiment of the information processing device according to the embodiment has been described above, a program of the embodiment is a program that causes the information processing device (for example, CPU) to execute each process in the server 1.

The program of the embodiment causes the information processing device to execute the page generating function and the presentation control function. The page generating function is configured to generate the web page data of the first window including the program causing the terminal device to execute the elapsed time determination process for obtaining the first time information at the timing of the transition from the first window to the second window, obtaining the second time information at the timing during which the process in the first window is executable in the state after the transition to the second window, calculating the elapsed time from the difference between the first time information and the second time information, and executing the predetermined process according to the comparison between the elapsed time and the threshold time. The presentation control function is configured to execute the process for transmitting the web page data of the first window to the terminal device and causing the terminal device to present the web page data.

That is, this program is a program causing the server 1 to execute the processes of the respective steps described in FIG. 13.

A program of the embodiment causes the terminal device to execute a first time information obtaining function, a second information obtaining function, an elapsed time calculation function, and an elapsed time determination function. The first time information obtaining function is configured to obtain the first time information at the timing of the transition from the first window to the second window. The second information obtaining function is configured to obtain the second time information at the timing during which the process in the first window is executable in a state after the transition to the second window. The elapsed time calculation function is configured to calculate the elapsed time from the difference between the first time information and the second time information. The elapsed time determination function is configured to execute the predetermined process according to the comparison between the elapsed time and the threshold time.

That is, this program is a program causing the user terminal 2 to execute the processes of the respective steps described in FIG. 10 to FIG. 12.

Such programs allow achieving the above-described information processing device as the server 1 or terminal device as the user terminal 2.

Such a program can be stored in advance in an HDD as a storage medium incorporated in a device, such as a computer device, a ROM in a microcomputer including the CPU and the like. Alternatively, such a program can be temporarily or permanently stored (memorized) in a removable storage medium, such as a semiconductor memory, a memory card, an optical disk, a magneto-optical disk, and a magnetic disk. Such a removable storage medium can be provided as, what is called, package software.

Such a program can be downloaded from a download website through a network, such as LAN and the Internet, besides installing from the removable storage medium into, for example, a personal computer.

REFERENCE SIGNS LIST

N network, 1 server, 2 user terminal, 3 database, 4 advertisement server, 11 control unit, 12 page generating unit

The invention claimed is:

1. An information processing device comprising:
   at least one memory configured to store computer program code; and
   at least one processor configured to access said computer program code and operate as instructed by said computer program code, said computer program code including:
   page generating code configured to cause at least one of said at least one processor to generate web page data of a first window including a program causing a terminal device to execute a first process for determining an elapsed time, the first process for determining an elapsed time comprising:
      obtaining first time information at a first timing of a first transition of focus from the first window to a second window,
      obtaining second time information at a second timing of a plurality of second timings during which a second process in the unfocused first window is executable in a state after the first transition to the focused second window,
      based on the focused second window maintaining focus after the first transition, calculating an elapsed time from a difference between the first time information and the second time information, and
      executing a predetermined third process according to a comparison between the calculated elapsed time and a threshold time; and
   presentation control code configured to cause at least one of said at least one processor to, prior to the first transition, execute a fourth process for transmitting the web page data to the terminal device and causing the terminal device to present the web page data in the first window that is in focus, wherein
   the first process for determining an elapsed time is executed on a browser in the terminal device, and
   specifications of the browser continuously allow processing in the focused second window, and allow processing in the unfocused first window only at the plurality of second timings,
   wherein the first process for determining an elapsed time further comprises, based on the second window being unfocused after the first transition and later being again focused according to a second transition of focus to the second window, calculating the elapsed time based on an addition of the following two periods:
   a first period starting from the timing of the first transition to a time when the second window becomes unfocused, and
   a second period starting from a timing of the second transition to a timing during which the second process in the first window is executable in a state after the second transition to the second window.

2. The information processing device according to claim 1, wherein
   the page generating code is further configured to cause at least one of said at least one processor to generate the web page data of the first window including a program causing the terminal device to execute a fifth process for determining whether the second window is focused, and when determining that the second window is unfocused, terminating the first process for determining an elapsed time.

3. The information processing device according to claim 1, wherein
   the first process for determining an elapsed time further includes a process for transmitting elapse information to the information processing device when the elapsed time passes over the threshold time or more.

4. The information processing device according to claim 3, wherein the at least one processor is further configured to update user information when the elapse information is received.

5. The information processing device according to claim 1, wherein
   when the elapsed time reaches the threshold time or more, the first process for determining an elapsed time further includes a process for transmitting information on content presented in the second window to the information processing device.

6. The information processing device according to claim 1, wherein
   the page generating code is further configured to cause at least one of said at least one processor to generate the web page data of the first window including a program causing the terminal device to execute, when receiving operation information to transition from the first window to the second window, a sixth process for transmitting a request of web page data presented in the second window after obtaining the first time information.

7. An information processing method executed by an information processing device, comprising:
   generating web page data of a first window including a program causing a terminal device to execute a first process for determining an elapsed time, the first process for determining an elapsed time comprising:
      obtaining first time information at a first timing of a first transition of focus from the first window to a second window;
      obtaining second time information at a second timing among a plurality of second timings during which a second process in the unfocused first window is executable in a state after the first transition to the focused second window;
      based on the focused second window maintaining focus after the first transition, calculating an elapsed time from a difference between the first time information and the second time information; and
      executing a predetermined third process according to a comparison between the calculated elapsed time and a threshold time; and
   prior to the first transition, executing a fourth process for transmitting the web page data to the terminal device and causing the terminal device to present the web page data in the first window that is in focus, wherein
   the first process for determining an elapsed time is executed on a browser in the terminal device, and specifications of the browser continuously allow processing in the focused second window, and allow processing in the unfocused first window only at the plurality of second timings, wherein the first process for determining an elapsed time further comprises, based on the second window being unfocused after the first transition and later being again focused according to a second transition of focus to the second window, calculating the elapsed time based on an addition of the following two periods:

a first period starting from the timing of the first transition to a time when the second window becomes unfocused, and a second period starting from a timing of the second transition to a timing during which the second process in the first window is executable in a state after the second transition to the second window.

8. A non-transitory computer-readable storage medium that records a program, the program causing an information processing device to execute:

a page generating function configured to generate web page data of a first window including a program causing a terminal device to execute a first process for determining an elapsed time, the first process for determining an elapsed time comprising:

obtaining first time information at a first timing of a first transition of focus from the first window to a second window;

obtaining second time information at a second timing among a plurality of second timings during which a second process in the unfocused first window is executable in a state after the first transition to the focused second window;

based on the focused second window maintaining focus after the first transition, calculating an elapsed time from a difference between the first time information and the second time information; and executing a predetermined third process according to a comparison between the calculated elapsed time and a threshold time; and a presentation control function configured to, prior to the first transition, execute a fourth process for transmitting the web page data to the terminal device and causing the terminal device to present the web page data in the first window that is in focus, wherein the first process for determining an elapsed time is executed on a browser in the terminal device, and specifications of the browser continuously allow processing in the focused second window, and allow processing in the unfocused first window only at the plurality of second timings, wherein the first process for determining an elapsed time further comprises, based on the second window being unfocused after the first transition and later being again focused according to a second transition of focus to the second window, calculating the elapsed time based on an addition of the following two periods:

a first period starting from the timing of the first transition to a time when the second window becomes unfocused, and a second period starting from a timing of the second transition to a timing during which the second process in the first window is executable in a state after the second transition to the second window.

* * * * *